(12) United States Patent
Mowers et al.

(10) Patent No.: US 10,823,469 B2
(45) Date of Patent: *Nov. 3, 2020

(54) RECIPROCATING REFRIGERATION COMPRESSOR WRIST PIN RETENTION

(71) Applicant: Carrier Corporation, Palm Beach Gardens, FL (US)

(72) Inventors: Matthew J. Mowers, Clay, NY (US); Paul J. Flanigan, Cicero, NY (US); Russell G. Lewis, Manlius, NY (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,920

(22) Filed: Jan. 3, 2019

(65) Prior Publication Data
US 2019/0137151 A1    May 9, 2019

Related U.S. Application Data

(63) Continuation of application No. 14/425,177, filed as application No. PCT/US2013/048165 on Jun. 27, 2013, now Pat. No. 10,197,311.
(Continued)

(51) Int. Cl.
*F25B 31/02* (2006.01)
*F04B 39/00* (2006.01)
(Continued)

(52) U.S. Cl.
CPC .......... *F25B 31/023* (2013.01); *F04B 17/03* (2013.01); *F04B 27/0409* (2013.01);
(Continued)

(58) Field of Classification Search
None
See application file for complete search history.

(56) References Cited

U.S. PATENT DOCUMENTS

| 1,923,717 A | 8/1933 | Frelin |
| 2,073,547 A | 3/1937 | Berry |

(Continued)

FOREIGN PATENT DOCUMENTS

| CN | 102308092 A | 1/2012 |
| GB | 1236592 | 6/1971 |
| GB | 2162282 A | 1/1986 |

OTHER PUBLICATIONS

U.S. Office Action dated Aug. 16, 2019 for U.S. Appl. No. 16/238,907.
(Continued)

*Primary Examiner* — Peter J Bertheaud
*Assistant Examiner* — Geoffrey S Lee
(74) *Attorney, Agent, or Firm* — Bachman & LaPointe, P.C.

(57) ABSTRACT

A compressor (20) has a case (22) and a crankshaft (38). The case has a number of cylinders (30-32). For each of the cylinders, the compressor includes a piston (34) mounted for reciprocal movement at least partially within the cylinder. A connecting rod (36) couples each piston to the crankshaft. A pin (44) couples each connecting rod to the associated piston. Each pin has first (52) and second (53) end portions mounted to first (56) and second (57) receiving portions of the associated piston and a central portion (48) engaging the associated connecting rod. For each of the pistons a pair of first and second at least partially non-metallic plugs have respective stems received in the pin first and second end portions and respective heads facing a wall surface of the associated cylinder.

20 Claims, 8 Drawing Sheets

Related U.S. Application Data (60) Provisional application No. 61/696,724, filed on Sep. 4, 2012.

(51) Int. Cl.
  *F04B 53/14* (2006.01)
  *F16J 1/18* (2006.01)
  *F04B 27/04* (2006.01)
  *F04B 17/03* (2006.01)

(52) U.S. Cl.
  CPC ...... *F04B 39/0005* (2013.01); *F04B 39/0022* (2013.01); *F04B 53/14* (2013.01); *F04B 53/144* (2013.01); *F04B 53/147* (2013.01); *F16J 1/18* (2013.01); *F05C 2225/00* (2013.01); *F05C 2225/08* (2013.01); *Y10T 403/32893* (2015.01)

(56) References Cited

U.S. PATENT DOCUMENTS

| | | |
|---|---|---|
| 2,360,876 A | 10/1944 | Hvid |
| 2,409,057 A | 10/1946 | Meinke |
| 2,583,583 A | 1/1952 | Mangan |
| 2,628,765 A | 2/1953 | Anderson |
| 2,796,744 A | 6/1957 | Buschmann |
| 2,844,162 A | 7/1958 | Hulslander |
| 3,003,837 A | 10/1961 | Flame et al. |
| 3,058,792 A | 10/1962 | Elford et al. |
| 3,480,113 A | 11/1969 | Pope et al. |
| 3,630,316 A | 12/1971 | Sillano et al. |
| 4,011,797 A | 3/1977 | Cornet |
| 4,026,197 A | 5/1977 | Lapke et al. |
| 4,189,984 A | 2/1980 | Tankred et al. |
| 4,331,065 A | 5/1982 | Fellberg |
| 4,640,641 A | 2/1987 | Edelmayer |
| 4,831,979 A | 5/1989 | DuBois et al. |
| 4,945,864 A | 8/1990 | Solomon et al. |
| 5,245,833 A | 9/1993 | Mei et al. |
| 5,289,758 A * | 3/1994 | Berlinger .................. F16J 1/18 123/193.6 |
| 5,542,341 A | 8/1996 | Monk et al. |
| 5,549,034 A | 8/1996 | Loughlin |
| 5,653,204 A | 8/1997 | Shaffer |
| 5,744,705 A | 4/1998 | Derouen et al. |
| 5,839,352 A | 11/1998 | Ribeiro et al. |
| 5,850,777 A | 12/1998 | Marklin et al. |
| 5,915,350 A | 6/1999 | Suzuki et al. |
| 5,966,936 A | 10/1999 | Pruitt |
| 5,979,597 A | 11/1999 | Grolier |
| 6,048,126 A | 4/2000 | Kemnitz et al. |
| 6,092,993 A | 7/2000 | Young et al. |
| 6,358,026 B1 | 3/2002 | Palmore |
| 6,591,621 B2 | 7/2003 | Loprete et al. |
| 6,684,755 B2 | 2/2004 | Boyd et al. |
| 6,827,057 B2 | 12/2004 | Dawson |
| 6,907,848 B2 | 6/2005 | Beardmore |
| 6,968,751 B2 | 11/2005 | Shulenberger et al. |
| 7,080,432 B2 | 7/2006 | Norwood |
| 7,094,043 B2 | 8/2006 | Skinner |
| 7,104,227 B2 | 9/2006 | Roberts |
| 7,175,400 B2 | 2/2007 | Collings |
| 7,273,355 B2 | 9/2007 | Collings |
| 7,287,494 B2 | 10/2007 | Buck |
| 7,765,917 B2 | 8/2010 | Hardin et al. |
| 7,779,627 B1 | 8/2010 | Ries |
| 7,861,679 B2 | 1/2011 | Lemke et al. |
| 7,909,012 B2 | 3/2011 | Pattakos et al. |
| 8,061,140 B2 | 11/2011 | Harmon, Sr. |
| 8,398,381 B1 | 3/2013 | Schumann |
| 9,221,184 B1 | 12/2015 | Wada et al. |
| 10,041,592 B2 | 8/2018 | Giebas et al. |
| 10,197,311 B2 * | 2/2019 | Mowers .............. F04B 27/0409 |
| 2005/0189725 A1 | 9/2005 | Edwards |
| 2007/0193549 A1 | 8/2007 | Chipperfield |
| 2011/0280750 A1 | 11/2011 | Flanigan |
| 2012/0097125 A1 | 4/2012 | Doss |
| 2012/0167759 A1 | 7/2012 | Chinthan et al. |
| 2012/0174770 A1 | 7/2012 | Ramm |
| 2012/0186444 A1 | 7/2012 | Yang et al. |

OTHER PUBLICATIONS

International Search Report and Written Opinion for PCT/US2013/048165, dated Oct. 7, 2013.
Wrist Pin Buttons-Teflon, CB Performance Racing Products Online Catalog, CB Performance Products, Inc., Farmersville, California, downloaded Aug. 14, 2012 from http://www.cbperformance.com/catalog.asp?ProductID=172.
Motorcycle Parts for American V-Twins, S&S Cycle, Inc., Viola, Wisconsin, downloaded Aug. 14, 2012 from http://www.sscycle.com/product/Replacement-Parts/For-Vintage-1936-1984/Top-End/Pistons/Wristpin-Button-p20859.html.
Ross Pistons B460-Ross Racing Wrist Pin Button-Style Retainers, Autosales Inc. d/b/a Summit Racing Equipment, Akron, Ohio, downloaded Aug. 14, 2012 from http://www.summitracing.com/parts/ROS-B460/.
Teflon Wristpin Buttons, California Import Parts Ltd., Blaine, Washington, downloaded Aug. 14, 2012 from http://www2.cip1.com/searchresults.asp?cat=1415.
Applicant admitted prior art: Wrist pin plastic washer photographs, Copeland compressor model No. 3DFDS11ME-TFD-800 of Emerson Climate Technologies, Inc., Sidney, Ohio, Apr. 25, 2011.
Chinese Office Action for Chinese Patent Application No. 201380046115.8, dated May 20, 2016.
Richard C. Cavestri, "Compatibility of Refrigerants and Lubricants with Engineering Plastics", Sep. 1993, The Air conditioning and Refrigeration Technology Institute, Arlington, Virginia.
U.S. Office Action for U.S. Appl. No. 14/425,177, dated Mar. 9, 2017.
U.S. Office Action for U.S. Appl. No. 14/425,177, dated Jun. 26, 2017.
U.S. Office Action for U.S. Appl. No. 14/425,177, dated Feb. 21, 2018.
U.S. Office Action dated Feb. 19, 2020 for U.S. Appl. No. 16/238,907.

* cited by examiner

RECIPROCATING REFRIGERATION COMPRESSOR WRIST PIN RETENTION

CROSS-REFERENCE TO RELATED APPLICATIONS

This is a continuation application of U.S. patent application Ser. No. 14/425,177, filed Mar. 2, 2015, and entitled "Reciprocating Refrigeration Compressor Wrist Pin Retention", which is a 371 US national stage application of PCT/US2013/048165, filed Jun. 27, 2013, which claims benefit of U.S. Patent Application No. 61/696,724, filed Sep. 4, 2012, and entitled "Reciprocating Refrigeration Compressor Wrist Pin Retention", the disclosures of which are incorporated by reference herein in their entireties as if set forth at length.

BACKGROUND

The present disclosure relates to refrigeration compressors. More particularly, it relates to reciprocating piston compressors utilized to compress gases such as low global warming potential (GWP) and natural refrigerants.

A variety of refrigerant compressor configurations are in common use. Among these configurations are: screw compressors; scroll compressors; and reciprocating piston compressors. In a reciprocating compressor a piston head is driven between a lower position at which a fluid to be compressed enters the compression cylinder, and an upper or "top" position at which the compressed fluid is driven outwardly of the cylinder An exemplary reciprocating piston compressor has a pin coupling each piston to the associated connecting rod. Such wrist pins may be in a journaled rotating fit to one or both of the piston and rod. In one exemplary configuration, a central portion of the pin is journaled in an end portion of the rod and end portions of the pin are journaled in associated bores in the piston. The pin may be retained against axial movement by clips abutting ends of the pins and partially captured in open channels in the piston bores. Alternative retainers include polymeric washers.

Separately, in the piston engine field, a proposal has been made to use plugs (U.S. Pat. Nos. 5,289,758 and 6,048,126) to position a wrist pin. In the compressor art, concealed plugs have been proposed in U.S. Pat. No. 5,850,777. Additionally plugs have been proposed in U.S. Pat. No. 6,358,026.

SUMMARY

One aspect of the disclosure involves a compressor having a case and a crankshaft. The case has a number of cylinders. For each of the cylinders, the compressor includes a piston mounted for reciprocal movement at least partially within the cylinder. A connecting rod couples each piston to the crankshaft. A pin couples each connecting rod to the associated piston. Each pin has first and second end portions mounted to first and second receiving portions of the associated piston and a central portion engaging the associated connecting rod. For each of the pistons a pair of first and second at least partially non-metallic plugs have respective stems received in the pin first and second end portions and respective heads facing a wall surface of the associated cylinder.

In various implementations, an electric motor within the case may be coupled to the crankshaft. The plugs may comprise a non-metallic material. They may comprise such material at least along the heads. The material may be a polybutylene terephalate. The plugs may consist of such material or consist essentially of such material. For each pin, the respective end portions may be journaled fit in the associated piston receiving portions. The central portion may be journaled fit in the associated connecting rod. The pins may be axially retained by a cooperation of the associated plug heads with the cylinder. They may be retained only via such cooperation. The plugs may comprise a pressure relief channel along the stem. The pressure relief channel may extend along an underside of the head. The heads may have a doubly convex outer surface having a principal radius of curvature within 5% of a transverse radius of curvature of the associated cylinder.

Other aspects of the disclosure involve a refrigeration system including such a compressor. The refrigeration system may include a recirculating flowpath through the compressor. A first heat exchanger may be positioned along the flowpath downstream of the compressor. An expansion device may be positioned along the flowpath downstream of the first heat exchanger. A second heat exchanger may be positioned along the flowpath downstream of the expansion device. The refrigerant charge may comprise at least 50% carbon dioxide or fluorocarbon by weight. The system may be a refrigerated transport system. The refrigerated transport system may further comprise a container. The second heat exchanger may be positioned to cool an interior of the container. The system may be a fixed refrigeration system. The fixed refrigeration system may further comprise multiple refrigerated spaces. There may be a plurality of said second heat exchangers, each being positioned to cool an associated such refrigerated space.

Another aspect of the disclosure involves a compressor wrist pin retaining plug comprising the unitarily molded combination of a hollow stem for receipt in a bore of a pin and a head. The stem protrudes from an underside of the head. A pressure relief channel is at least partially on the stem and head.

In various implementations, the channel may be an open channel extending continuously along the stem and the underside of the head to a periphery of the head. The stem may comprise a tapered end. The plug may comprise a polybutylene terepthalate. The plug may consist of polybutylene terepthalate.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
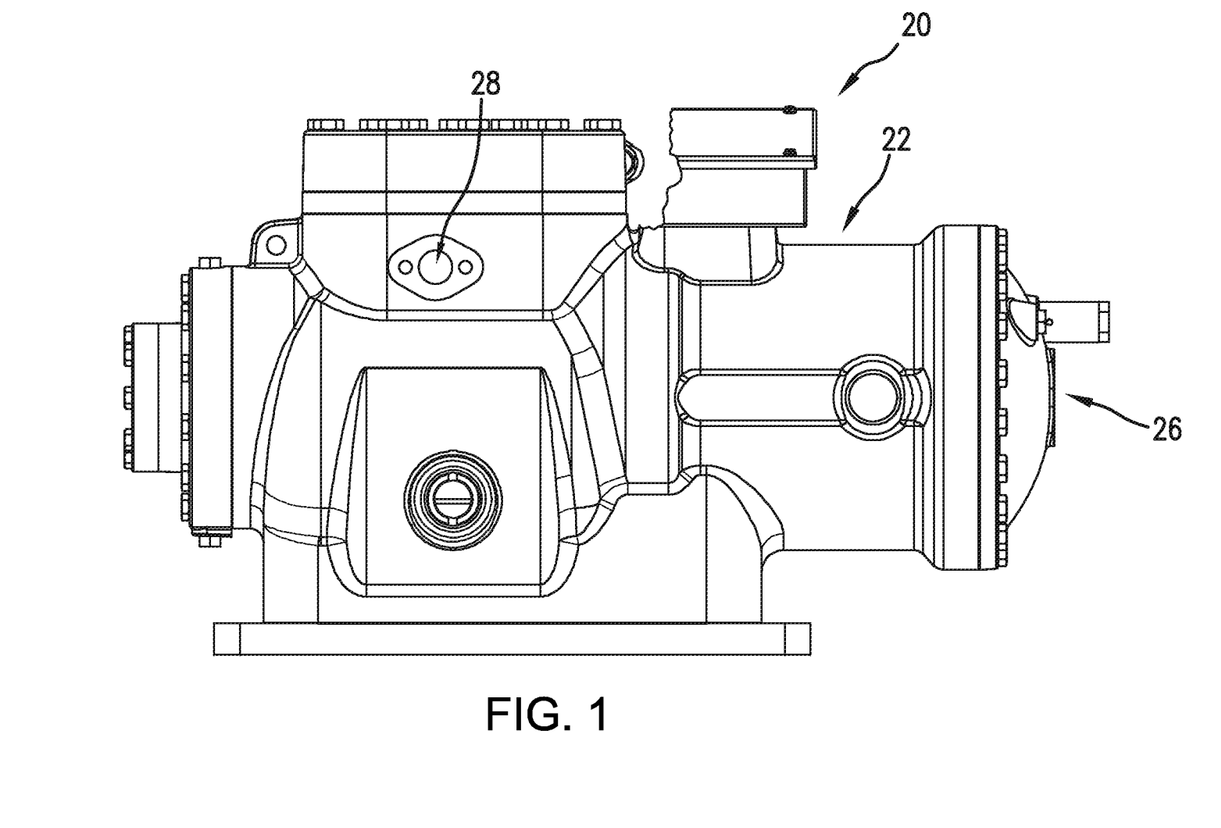
FIG. 1 is a side view of a compressor.
Figure 2:
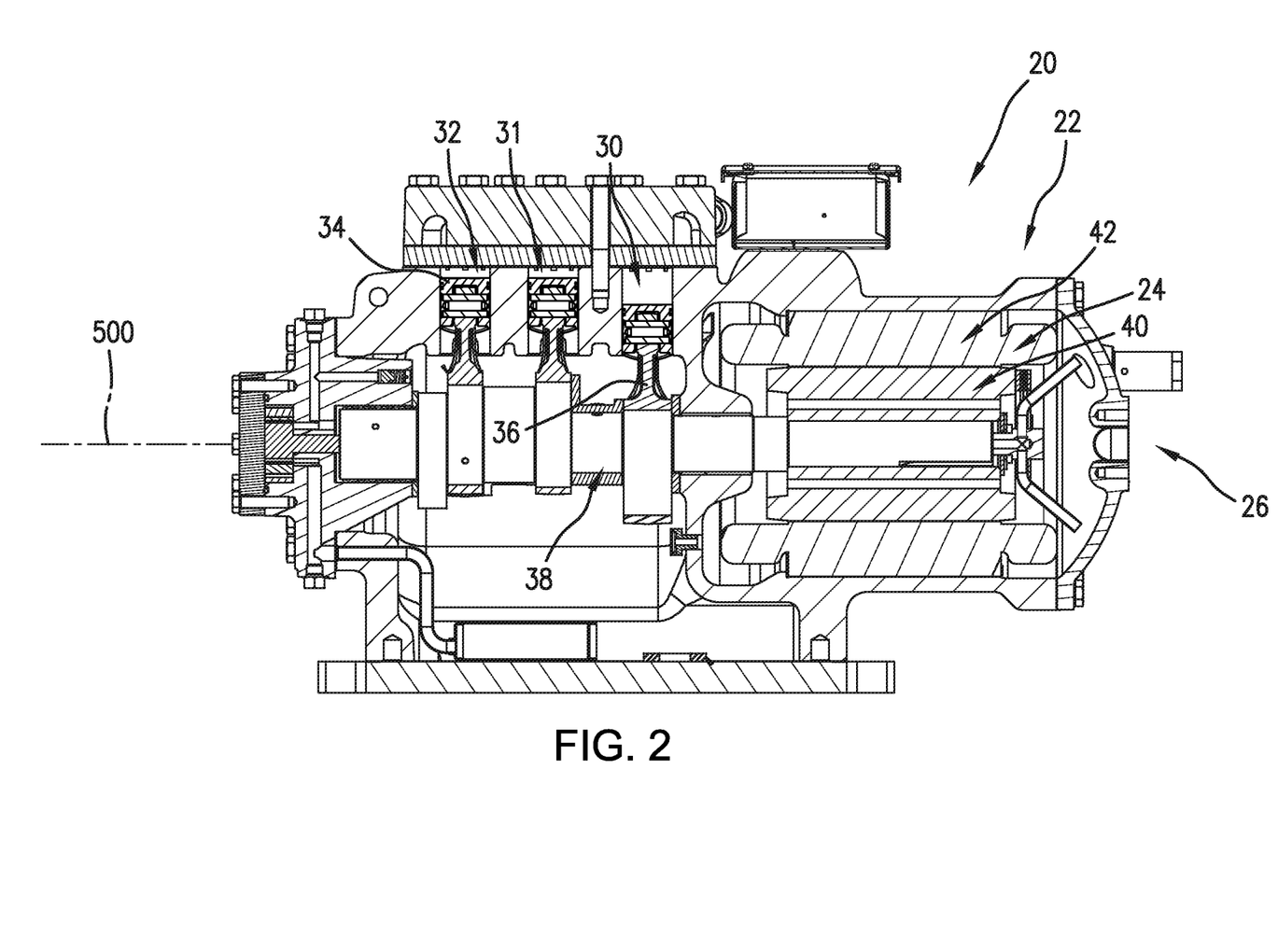
FIG. 2 is a vertical longitudinal sectional view of the compressor of FIG. 1.

FIGS. 1 and 2 show an exemplary compressor 20. The compressor 20 has a housing (case) assembly 22. The exemplary compressor includes an electric motor 24 (FIG. 2). The exemplary case 22 has a suction port (inlet) 26 and a discharge port (outlet) 28. The housing defines a plurality of cylinders 30, 31, and 32. Each cylinder accommodates an associated piston 34 mounted for reciprocal movement at least partially within the cylinder. Exemplary multi-cylinder configurations include: in-line; V (vee); and horizontally opposed. The exemplary in-line compressor includes three cylinders. Each of the cylinders includes a suction location and a discharge location. For example, the cylinders may be coupled in parallel so that the suction location is shared/common suction plenum fed by the suction port 26 and the discharge location is a shared/common discharge plenum feeding the discharge port 28. In other configurations, the cylinders may share suction locations/conditions but have different discharge locations/conditions. In other configurations, the cylinders may be in series. An exemplary fluorocarbon-based refrigerant is R-410A. An exemplary carbon dioxide ($CO_2$)-based (e.g., at least 50% $CO_2$ by mass/weight) refrigerant is R-744.

Figure 3:
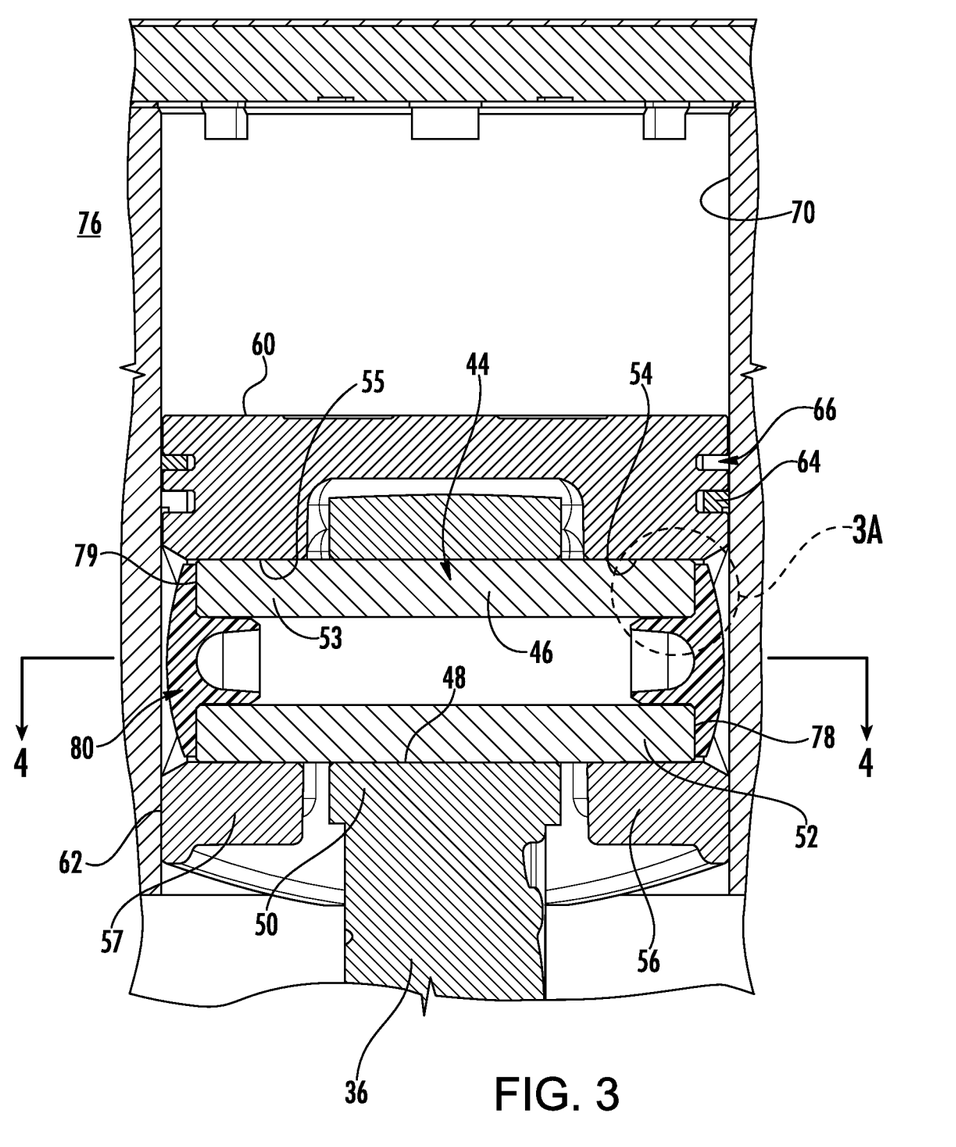
FIG. 3 is a partial vertical longitudinal sectional view of a cylinder of the compressor of FIG. 1.

Each of the pistons 34 is coupled via an associated connecting rod 36 to a crankshaft 38. The exemplary crankshaft 38 is held within the case by bearings for rotation about an axis 500. The exemplary crankshaft is coaxial with a rotor 40 and stator 42 of the motor 24. Each piston 30-32 is coupled to its associated connecting rod 36 via an associated wrist pin 44. FIG. 3 shows the pin 44 as having a central portion 46 mounted for rotation in an aperture 48 in a distal end portion 50 of the connecting rod 36. In various implementations, the aperture may be in a bushing interference fit in a main piece of the connecting rod. The pin has first and second end portions 52 and 53 mounted in apertures 54 and 55 of associated receiving portions 56 and 57 of the piston (e.g., in a non-interference journaled fit).

The exemplary piston has a distal end face 60 and a lateral/circumferential surface 62. One or more sealing rings 64 may be carried in corresponding grooves 66 in the surface 62. To seal with the cylinder lateral wall (bore) surface 70. In alternative cylinders, at least a portion of the cylinder wall/surface 70 is formed by the interior surface of a sleeve (e.g., press fit in the cylinder block 76).

As so far described, the compressor may be representative of any of a number of possible reciprocating piston compressors to which the following teachings may be applied.

Figure 3A:
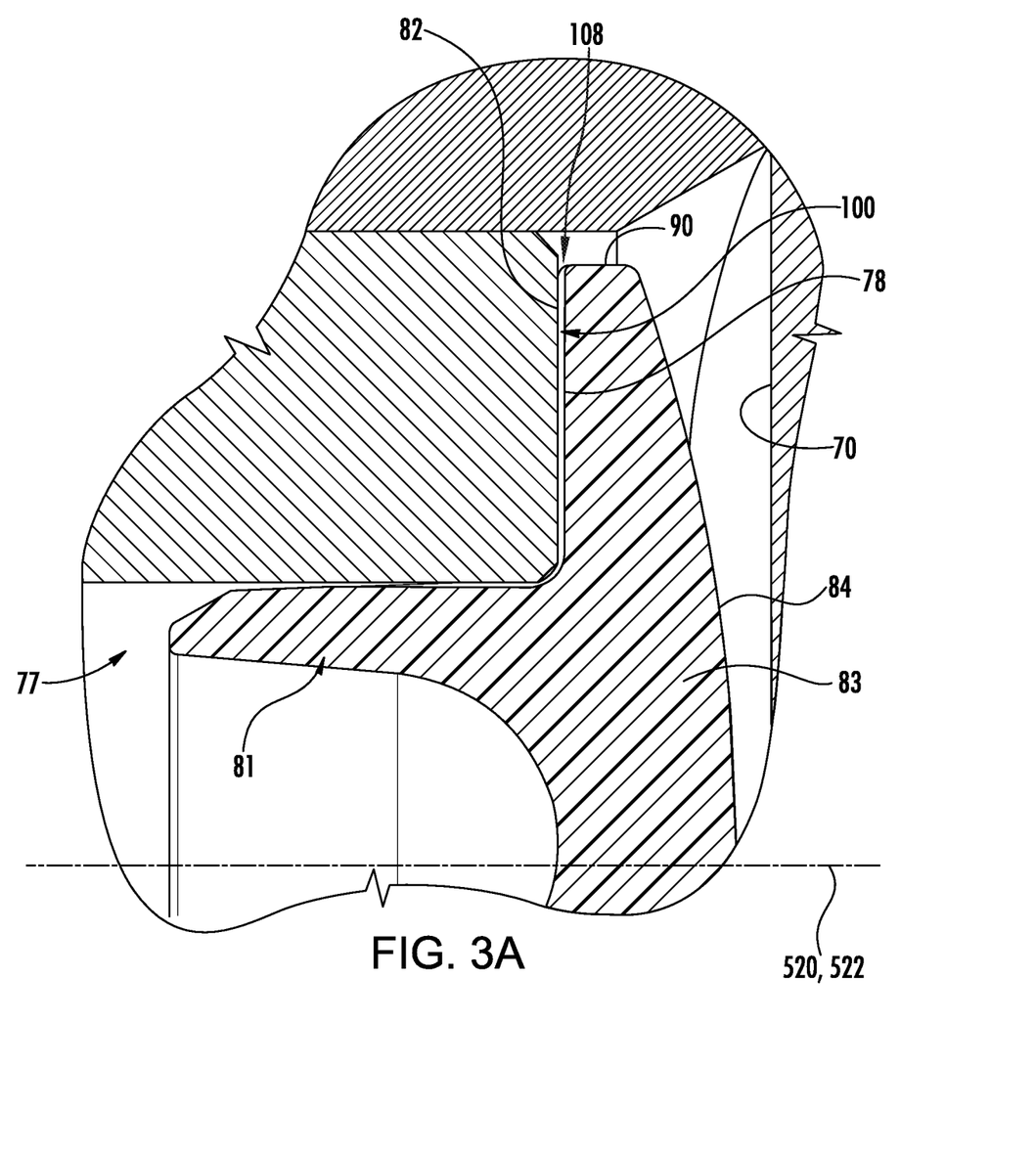
FIG. 3A is an enlarged view of a wrist pin end of the cylinder of FIG. 3.
Figure 4:
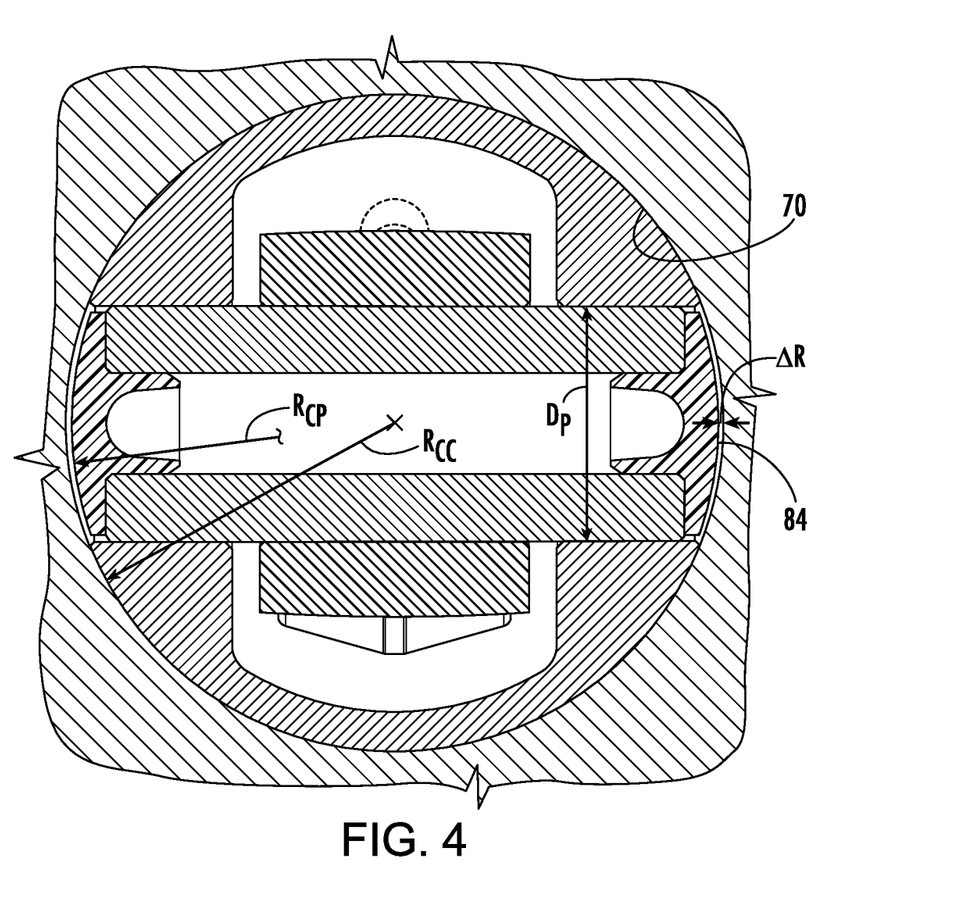
FIG. 4 is a partial transverse longitudinal sectional view of the cylinder of FIG. 3, taken along line 4-4 of FIG. 3.

FIG. 3 shows a pair of plugs 80 mounted in the associated pin end portions 52 and 53. Each of the plugs has a stem 81 (FIG. 3A) inserted into end portions of a channel (e.g., a bore) 77 in the pin 59. The stem 81 depends from the underside 82 of a head 83. The head undersides abut pin ends (rims) 78 and 79. As is discussed further below, the heads have a doubly convex outer surface 84. Exemplary head outer surfaces 84 are in close facing relation or contacting the cylinder wall 70. The exemplary curvature is such that, as seen in the transverse sectional view of FIG. 4, the surface 84 along a transverse centerplane 522 (FIG. 6) is concentric with the cylinder wall (FIG. 4). Exemplary plug heads are rotationally symmetric about the axis 520 except for the channel 100 and thus have similar curvatures along the transverse centerplane 522 and vertical centerplane 524. It is noted that the plugs need not be limited to this orientation. Additionally, other channel configurations may be featured as may other stem and head configurations. The exemplary configuration matches head radius of curvature $R_{CP}$ to within 10% (more narrowly, 5%) with the transverse radius of curvature $R_{CC}$ of the cylinder wall surface along a majority of a circumferential length of the head along such transverse plane ($R_{CP}$ thus typically being lower than $R_{CC}$. Overall axial (relative to the pin axis but diametric for the cylinder) clearance is twice the illustrated centered clearance ΔR. The float of the pin may close the gap at either end. Wear of the head may expand the clearance. Exemplary combined clearance at the heads of the two plugs is 3-6 mm, more particularly 4.0-5.5 mm or 4.1-5.4 mm when new. With a cylinder inner diameter (ID) of about 62.1 mm, an exemplary wrist pin length is 54.6 mm or at least 85% thereof, more particularly 85-92% or 87-90%.

Figures 5, 6, 8:
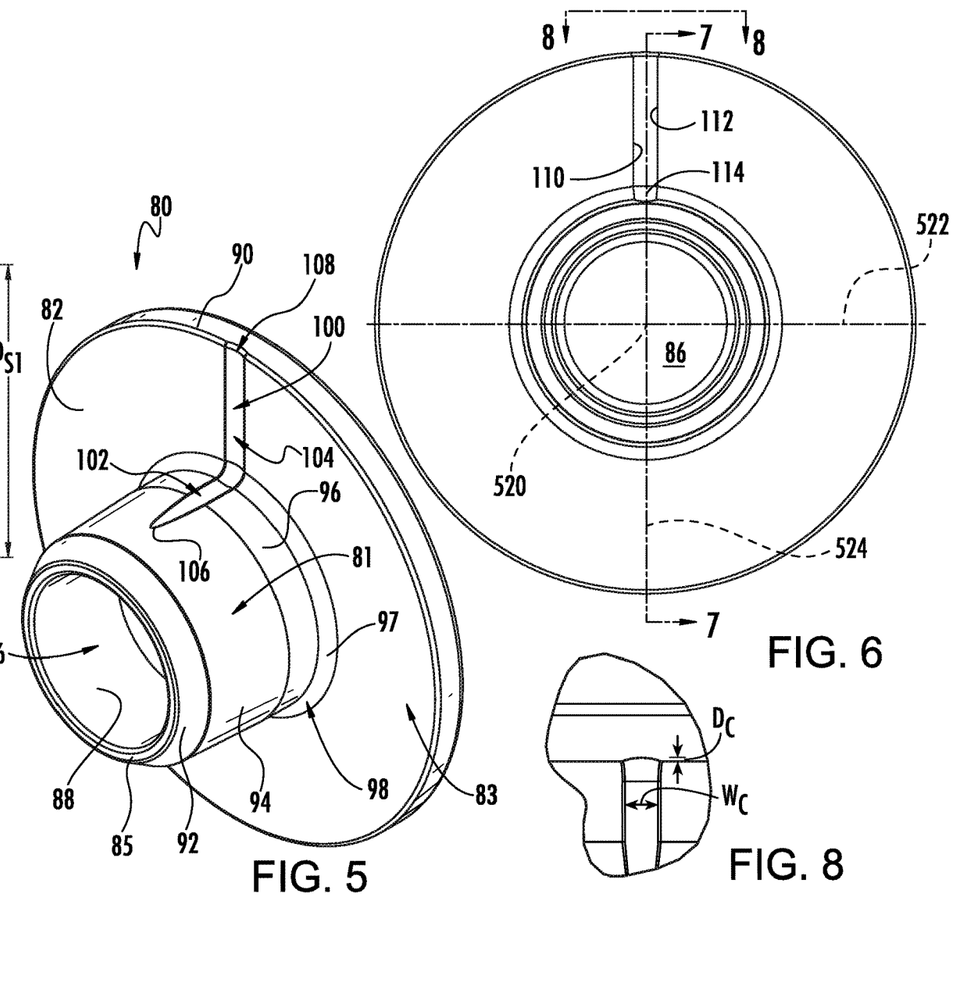
FIG. 5 is a view of a wrist pin plug for the compressor of FIG. 1.
FIG. 6 is an end view of the plug of FIG. 5.
FIG. 8 is a partial radial inward view of a channel in the plug of FIG. 6, taken along line 8-8 of FIG. 6.
Figure 7:
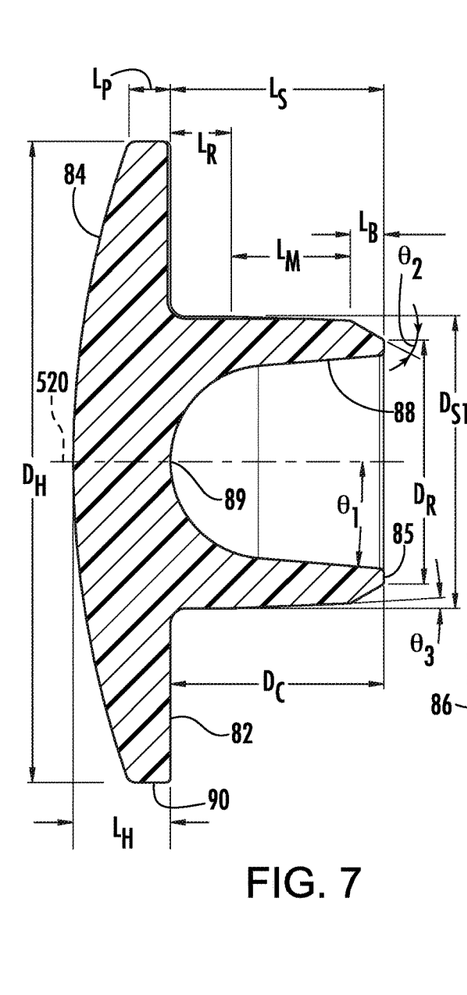
FIG. 7 is a longitudinal/axial sectional view of the plug of FIG. 6, taken along line 7-7 of FIG. 6.

FIG. 5 shows further details of the exemplary plug 80. The stem 81 extends to a distal end 85. In the exemplary embodiment, the end 85 is formed as a rim surrounding a central compartment/channel 86. The exemplary compartment 86 extends along a central axis 520 (FIG. 6) to the head or near the head. FIG. 7 shows the exemplary compartment defined by a surface comprising a tapering surface 88 (at an exemplary constant half angle $θ_1$) extending inward from the rim 85 to a nearly semi-spherical surface 89 forming a base/end of the compartment. FIG. 7 also shows a stem length $L_S$ from an intact (discussed later) planar portion of the head underside 82 to the rim 85. FIG. 7 also shows a compartment depth $D_C$ which may be very close to or coincident to $L_H$. In terms of additional dimensions, FIG. 7 shows the head as having an approximately cylindrical peripheral/lateral surface 90 having a diameter $D_H$. A height of the head is shown as $L_H$. In this embodiment, exemplary $D_H$ is 21 mm, more broadly 19-22 mm. Other sizes would be appropriate for other compressors. Similarly, exemplary $L_S$ from is 7 mm, more broadly 5-10 mm. Exemplary stem diameter is 10 mm, more particularly about 9.6 mm Returning to FIG. 5, the exemplary stem is shown as having a varied cross-section or diameter. Proximally of the rim 85 is a frustoconical bevel 92. The exemplary bevel 92 has a length $L_B$ (FIG. 7) and a half angle $θ_2$ and a length $L_B$. Proximally of the surface portion 92 is a shallower main surface portion 94 (e.g., frustoconical) extending over a length $L_M$ at a half angle $θ_3$. A generally cylindrical surface portion 96 extends proximally of the surface portion 94 and along with a radiused transition 97 (at a stem root 98) to the head underside extends for a length $L_R$. Head height $L_H$ and perimeter height $L_P$ are advantageously low enough to allow sufficient length of engagement between pin and piston, but advantageously thick enough to provide wear resistance and ease of molding. Exemplary $D_H$ is slightly lower than the wrist pin diameter $D_P$ (e.g., 90-100%, more particularly 92-99% or 93-98%). Exemplary $L_P$ are 1-3 mm, more particularly, 1.0-2.0 mm. With the exemplary cylinder diameter of 62 mm and 31 mm radius, exemplary principal head radius of curvature is within 10% or 5% of this as noted above, more particularly 95-100% (29-31 mm for this example).

As is discussed further below, the plug includes a pressure relief channel 100 (FIG. 5). The exemplary pressure relief channel includes a first portion 102 along or through the stem and a second portion 104 along or through the head. The exemplary channel is open along both these portions 102 and 104. The portion 102 extends from a distal end 106 to a proximal end at a junction with the portion 104 at the stem root. The portion 104 extends radially outward along the head underside 82 to a second end 108. FIG. 6 shows the channel as including a first rim 110 and a second rim 112 with a base 114 therebetween. Exemplary channel depth $D_C$ along the stem is nominal 1.3 mm, with a +/−0.5 mm tolerance. More broadly, exemplary depth is 0.5-2.0 mm. Exemplary depth along the head underside may be smaller (due to less deformation; the stem is subject to a deforming press-fit, whereas the head has less contact force). Exemplary depth along the head is at least 0.05 mm, more particularly 0.05-0.02 mm. Exemplary width $W_C$ is greater than the depth along the stem (e.g., about twice, more broadly 1.5-3.0 times or 2.6+/−0.5 mm in this example). The exemplary channel is arcuate in cross-section (e.g. of an essentially constant radius of curvature).

Exemplary plugs are entirely or at least along outboard portions thereof polymeric/resinous. Exemplary polyester resin is a semi-crystalline polybutylene terephthalate (PBT) such as VALOX 310 from SABIC Innovative Plastics Holding BV, Riyadh, Saudi Arabia. Exemplary such plugs are injection molded.

In the installed condition, the pin bore 59 surface and associated pin rim laterally enclose the channel 100 to allow venting between the pin interior and the associated space between the head and cylinder wall. This resists any tendency of any excess of pressure in the pin driving the plugs outward into contact with the cylinder wall which would encourage wear of the head.

Figure 9:
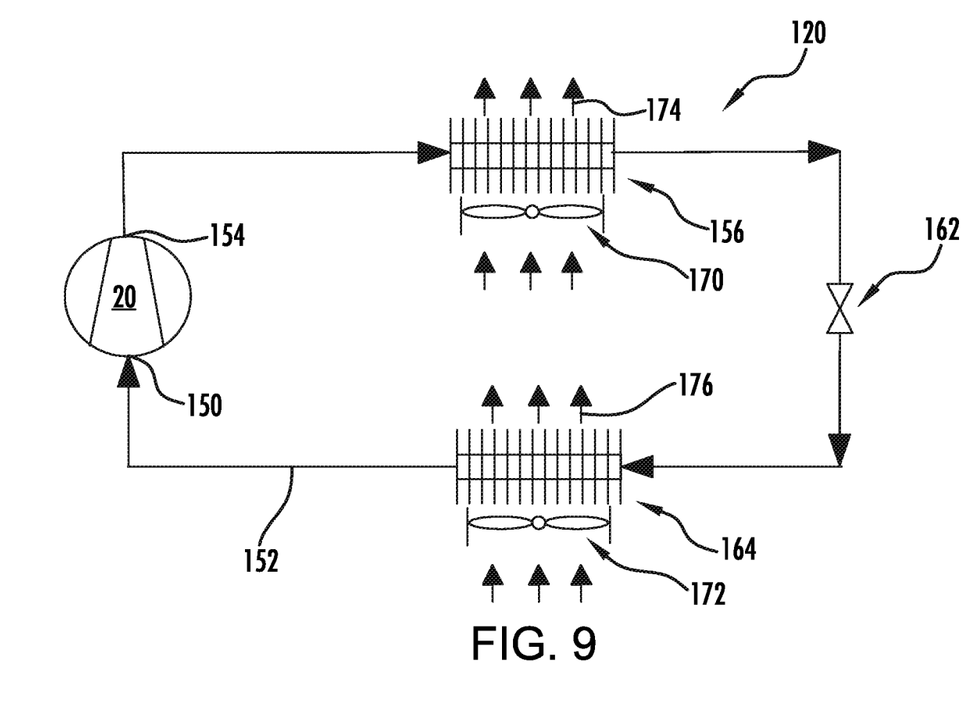
FIG. 9 is a schematic view of a refrigeration system.

FIG. 9 shows an exemplary refrigeration system 140 including the compressor 20. The system 120 includes a system suction location/condition 150 at the suction port 26. A refrigerant primary flowpath 152 proceeds downstream from the suction location/condition 150 through the compressor cylinders in parallel to be discharged from a discharge location/condition 154 at the discharge port 28. The primary flowpath 152 proceeds downstream through the inlet of a first heat exchanger (gas cooler/condenser) 156 to exit the outlet of the gas cooler/condenser. The primary flowpath 152 then proceeds downstream through an expansion device 162. The primary flowpath 152 then proceeds downstream through a second heat exchanger (evaporator) 164 to return to the suction condition/location 150.

In a normal operating condition, a recirculating flow of refrigerant passes along the primary flowpath 152, being compressed in the cylinders. The compressed refrigerant is cooled in the gas cooler/condenser 156, expanded in the expansion device 162, and then heated in the evaporator 164. In an exemplary implementation, the gas cooler/condenser 156 and evaporator 164 are refrigerant-air heat exchangers with associated fan (170; 172)-forced airflows (174; 176). The evaporator 164 may be in the refrigerated space or its airflow may pass through the refrigerated space. Similarly, the gas cooler/condenser 156 or its airflow may be external to the refrigerated space.

Additional system components and further system variations are possible (e.g., multi-zone/evaporator configurations, economized configurations, and the like). Exemplary systems include refrigerated transport units and fixed commercial refrigeration systems.

Figure 10:
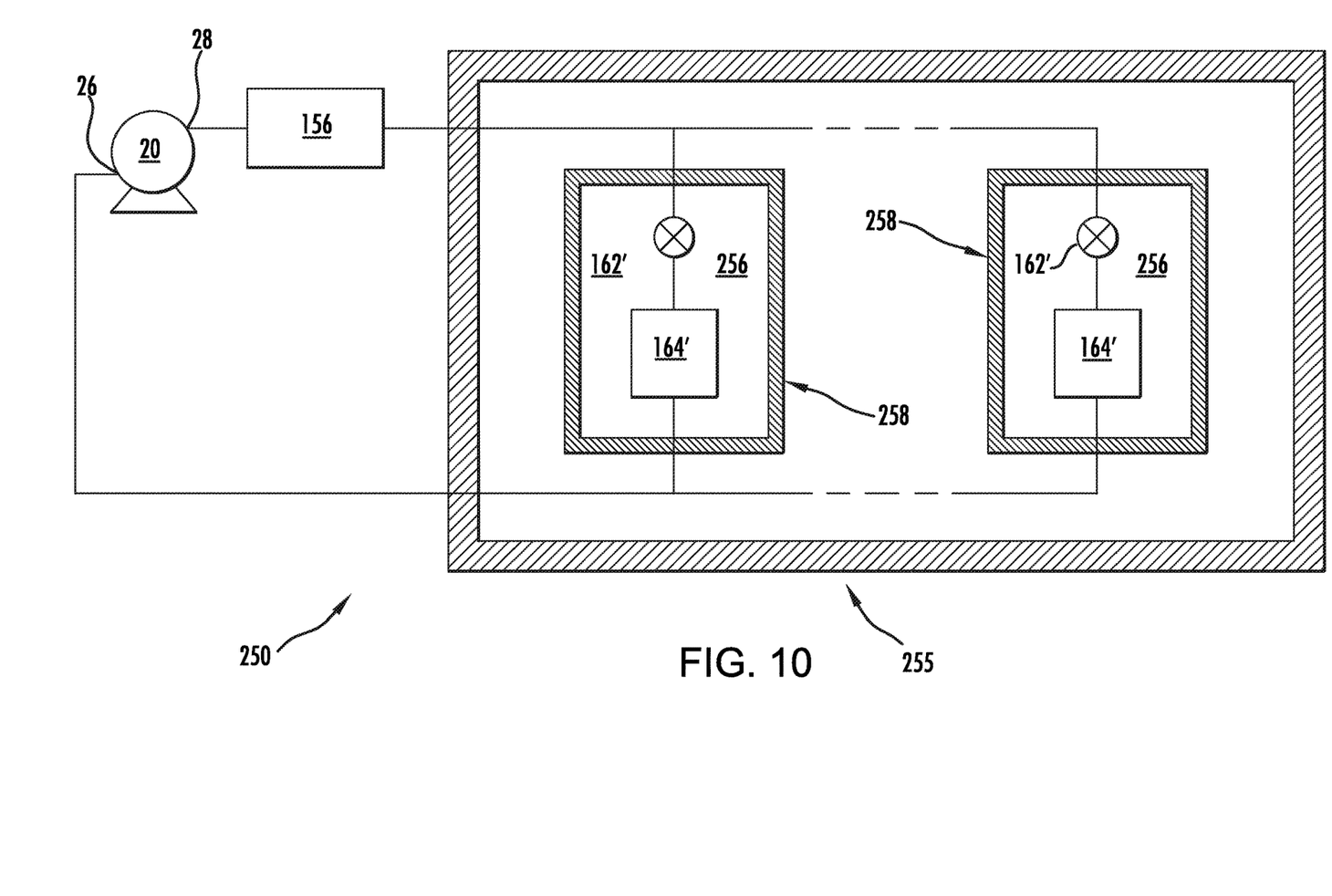
FIG. 10 is a schematic view of a fixed commercial refrigeration system.

An exemplary fixed commercial refrigeration system 250 (FIG. 10) includes one or more central compressors 20 and heat rejection heat exchangers 156 (e.g., outside/on a building 255) commonly serving multiple refrigerated spaces 256 (e.g., of retail display cabinets 258 in the building). Each such refrigerated space may have its own heat absorption heat exchanger 164' and expansion device 162' (or there may be a common expansion device). Other rack-mount situations include building heating, ventilation and air conditioning (HVAC).

The compressor may be manufactured via otherwise conventional manufacturing techniques. The pistons, pins, rods, and cylinder block may be cast and/or machined as may other components. The assembly may involve mounting the connecting rods to the pistons via the pins. This may be performed by hand. Similarly, the plugs may be installed by hand with the surface portion 92 of FIG. 5 guiding insertion into the pin bore. This may eliminate the use of press-fitting or clip-applying tools in a baseline compressor. The pistons may be inserted into the cylinders. The connecting rods may be mated to the crankshaft. The case may be assembled over the crankshaft (e.g., by mating a sump to the cylinder block). The remaining elements may be assembled.

Although an embodiment is described above in detail, such description is not intended for limiting the scope of the present disclosure. It will be understood that various modifications may be made without departing from the spirit and scope of the disclosure. For example, when implemented in the reengineering of an existing (baseline) compressor configuration, details of the existing configuration may influence or dictate details of any particular implementation. Accordingly, other embodiments are within the scope of the following claims.

What is claimed is:

1. A compressor comprising:
a case having a plurality of cylinders;
a crankshaft; and
for each of said cylinders:
   a piston mounted for reciprocal movement at least partially within the cylinder;
   a connecting rod coupling the piston to the crankshaft; and
   a pin coupling the connecting rod to the piston, the pin having: first and second end portions mounted in first and second receiving portions of the piston; and a central portion engaging the connecting rod,
wherein:
a pair of first and second at least partially non-metallic plugs have respective stems received in the pin first and second end portions and respective heads each having a surface facing a wall surface of the associated cylinder; and
the plugs comprise a pressure relief channel along the stem, wherein along a first portion along the stem the channel has a first rim and a second rim with a base extending along the stem between the first rim and the second rim.

2. The compressor of claim 1 further comprising:
an electric motor within the case coupled to the crankshaft.

3. The compressor of claim 1 wherein:
the plugs comprise a polybutylene terephthalate.

4. The compressor of claim 1 wherein:
the plugs comprise, along the heads, a polybutylene terephthalate.

5. The compressor of claim 1 wherein:
the plugs consist of a non-metallic material.

6. The compressor of claim 1 wherein:
for each said pin, the respective end portions are journaled fit in the associated piston receiving portions.

7. The compressor of claim 6 wherein:
for each said pin, the central portion is journaled fit in the associated connecting rod.

8. The compressor of claim 7 wherein:
the pins are axially retained only via cooperation of the associated plug heads with the cylinder.

9. The compressor of claim 1 wherein:
for each of the plugs, the pressure relief channel is along an outer diameter surface of the stem.

10. The compressor of claim 9 wherein:
the plug stems are press-fit in respective bores of the respective pins.

11. The compressor of claim 1 wherein:
the heads have a doubly convex outer surface having a principal radius of curvature within 5% of a transverse radius of curvature of the associated cylinder.

12. A refrigeration system comprising:
the compressor of claim 1;
a refrigerant recirculating flowpath through the compressor;
a first heat exchanger along the flowpath downstream of the compressor;
an expansion device along the flowpath downstream of the first heat exchanger; and
a second heat exchanger along the flowpath downstream of the expansion device.

13. The compressor of claim 1 wherein:
for each of the plugs, the pressure relief channel first portion and its first rim and second rim extend axially along an outer diameter surface of the stem.

14. A compressor comprising:
a case having a plurality of cylinders;
a crankshaft; and
for each of said cylinders:
    a piston mounted for reciprocal movement at least partially within the cylinder;
    a connecting rod coupling the piston to the crankshaft; and
    a pin coupling the connecting rod to the piston, the pin having: first and second end portions mounted in first and second receiving portions of the piston; and a central portion engaging the connecting rod,
wherein:
    a pair of first and second at least partially non-metallic plugs have respective stems received in the pin first and second end portions and respective heads each having a surface facing a wall surface of the associated cylinder; and
    the plugs comprise a pressure relief channel comprising a first portion along the stem and second portion along an underside of the head wherein the second portion is an open channel being a groove.

15. The compressor of claim 14 wherein:
the plugs comprise a polybutylene terepthalate.

16. The compressor of claim 14 wherein:
the plugs consist of a non-metallic material.

17. A compressor comprising:
a case having a plurality of cylinders;
a crankshaft; and
for each of said cylinders:
    a piston mounted for reciprocal movement at least partially within the cylinder;
    a connecting rod coupling the piston to the crankshaft; and
    a pin coupling the connecting rod to the piston, the pin having: first and second end portions mounted in first and second receiving portions of the piston; and a central portion engaging the connecting rod,
wherein:
    a pair of first and second at least partially non-metallic plugs have respective stems received in the pin first and second end portions and respective heads each having a surface facing a wall surface of the associated cylinder; and
    the plugs comprise a pressure relief channel comprising a first portion along the stem and second portion along an underside of the head wherein the second portion is an open channel open along its length.

18. The compressor of claim 17 wherein:
the plugs comprise a polybutylene terepthalate.

19. The compressor of claim 17 wherein:
the plugs comprise, along the heads, a polybutylene terepthalate.

20. The compressor of claim 17 wherein:
the plugs consist of a non-metallic material.

* * * * *